United States Patent [19]

McKinney

[11] 4,107,043

[45] Aug. 15, 1978

[54] INLET CONDUIT FLUID FILTER

[75] Inventor: James C. McKinney, Atlanta, Ga.

[73] Assignee: Creative Dispensing Systems, Inc., Atlanta, Ga.

[21] Appl. No.: 774,147

[22] Filed: Mar. 3, 1977

[51] Int. Cl.² .................. B01D 25/00; B01D 25/18
[52] U.S. Cl. .............................. 210/232; 210/462; 210/463; 210/492; 222/189
[58] Field of Search ............ 210/232, 460, 462, 463, 210/488, 492; 222/189, 189 X

[56] References Cited

U.S. PATENT DOCUMENTS

| 2,234,678 | 3/1941 | Matson | 210/492 |
|---|---|---|---|
| 2,495,996 | 1/1950 | Wolcott | 210/488 |
| 2,572,097 | 10/1951 | Bakker | 210/488 |
| 2,641,365 | 6/1953 | Lundeen | 210/460 |
| 3,209,954 | 10/1965 | Webster | 210/463 |
| 3,690,463 | 9/1972 | O'Brien | 210/242 |

Primary Examiner—Charles N. Hart
Assistant Examiner—David R. Sadowski

[57] ABSTRACT

A one-piece molded fluid filter for a fluid dispenser dip tube includes two circular plate portions, at least one having radially extending ribs which define a plurality of fluid passages between the plates. A tubular portion, extending coaxially from the upper of the plates, is adapted for engaging the dip tube and providing communication between the dip tube and the passages. A member extending coaxially from the lower of the plates is provided for insertion into the tubular portion to pressurely engage the tubular portion to maintain the plates adjacent one another. The plates are connected along portions of their circumferences by an integral hinge and may be pivoted with respect to one another about the hinge to expose the ribs for cleaning.

5 Claims, 4 Drawing Figures

INLET CONDUIT FLUID FILTER

BACKGROUND OF THE INVENTION

The present invention relates to a novel filter for inlet conduits, especially inlet dip tubes of fluid dispensers.

It is well known to provide a fluid conduit filter having a separate perforate filter element located in the fluid flow path. Such a conventional filter, for the inlet dip tube of a spray dispenser, is illustrated, for example, in Design Pat. No. 240,036 to Tada. The filter includes a tubular hub portion, pressurely fit on the end of the dip tube. A perforate filter element is disposed within the hub and held in position by an apertured disc, which is snap-fitted in the hub. Such filters have the disadvantages that (1) they are composed of at least three separate parts; (2) they are not easily disassembled; and (3) the filter element must be removed to be cleaned.

It is also well known to provide a fluid filter having a donut-shaped filter element, through which fluid is drawn radially inwardly. A known fuel feeding device illustrated, for example, in U.S. Pat. No. 3,483,988 to Hazzard, includes a donut shaped element gripped between a first annular flange and a second flange, the second flange being formed with a male projection for insertion into the central opening of the annular flange. Such devices have disadvantages in that they are composed of at least three separate parts and require that the element be removed to be cleaned.

Accordingly, it is an object of the present invention to provide a novel dip tube filter formed of a single molded part.

Another object of the present invention is to provide a novel dip tube filter which is easily cleaned.

Yet another object of the present invention is to provide a novel and easily and inexpensively fabricated fluid conduit filter which effectively filters fluid drawn into the conduit.

These and other objects and features of the present invention will become apparent from the claims and from the following description when read in conjunction with the appended drawings.

THE DRAWINGS

DETAILED DESCRIPTION

According to the present invention, a filter may be provided for the dip tube of a spray dispenser. The filter may comprise a one-piece molded member, including two circular plate portions, at least one having radially extending ribs which define a plurality of fluid passages between the plates when the plates are coaxially aligned. A tubular portion may be provided for engaging the dip tube, which tubular portion may extend coaxially from one of the plates and communicate with the plurality of passages. Radially extending members, extending coaxially from the other of the plates may be provided to pressurely engage inner walls of the tubular portion of the first plate to maintain the surfaces of the plates adjacent one another. The plates may be connected along portions of their circumferences by an integral hinge. The plates may be pivoted with respect to one another about the hinge to disengage the coaxially extending members from the tubular portion, thereby exposing the ribs for cleaning.

The one piece molded member may be assembled to provide a dip tube filter by pivoting one of the circular plates about the hinge and pressurely engaging the axially extending members with the tubular portion of the one piece molded member. The filter so formed may be secured to the dip tube of a fluid dispenser by engaging an inner surface of the tubular portion with an outer wall of the dipsenser dip tube. The dip tube and filter may be configured so that a lower one of the circular plates is located parallel and adjacent to a bottom wall of a fluid container for the dispenser. Fluid to be dispensed by the dispenser may be drawn radially inwardly between the ribs, thereby filtering solid matter from the fluid of a size larger than the spaces between the ribs.

Figure 1:
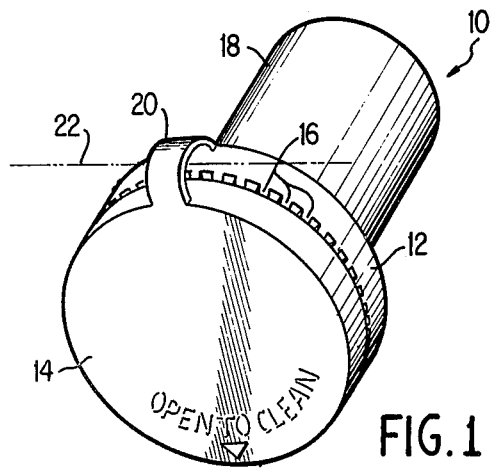
FIG. 1 is a pictorial view of an inlet conduit filter embodiment of the present invention.

Referring now to FIG. 1, a dip tube filter embodiment of the present invention is shown. The filter may include two generally circular plates 12 and 14. The plate 12 may also be annular in shape, and have radially extending ribs 16 formed in a surface thereof. A tubular hub portion 18 may extend coaxially from the annular plate 12. The hollow of the tubular portion 18 (not shown) may communicate with the central opening (not shown) of the annular plate 12. The plates 12 and 14 may be connected along portions of their circumferences by an integral hinge 20. The plates 12 and 14 may be pivoted with respect to one another about an axis 22, defined by the hinge, to expose the ribs 16 for cleaning.

Figure 2:
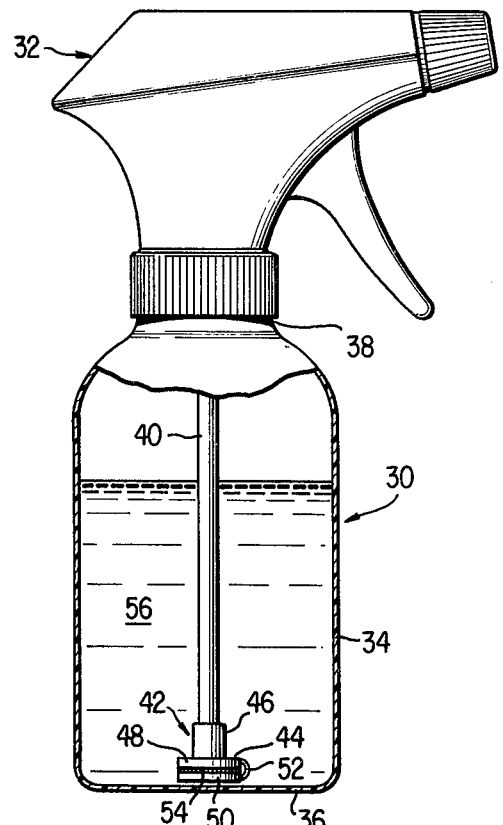
FIG. 2 is a pictorial view of a filtered fluid supply embodiment of the present invention attached to a fluid dispenser.

FIG. 2 is a pictorial view of a filtered fluid supply embodiment 30 of the present invention attached to a conventional fluid dispenser 32. The filtered fluid supply apparatus may include a fluid container 34 with a bottom wall 36 and a mouth 38 for threaded attachment to the fluid dispenser 32. An inlet dip tube 40, providing fluid communication between the dispenser 32 and the container 34, may extend from the mouth 38 of the container toward the bottom wall 36 of the container. A fluid filter 42 may be attached to an end portion of the dip tube 40. The filter 42 may include a collar portion 44 having a tubular portion 46 for engaging the dip tube 40 and a first generally circular plate 48. A second generally circular plate, selectively positionable adjacent to the first circular plate may be hingedly connected by means of hinge portion 52 to the first circular plate. At least one of the first and second plates may be formed with radially extending ribs 54 for providing a plurality of fluid passages between the plates in communication with said tubular portion 46 and the dip tube 40. The second plate may be located adjacent and parallel to the bottom wall 36 of the fluid container.

In operation, a molded member having the above described portions 46, 48, 50 and 52 is provided. The tubular portion 46 may be grippingly engaged to the dip tube 40; the inner surface of the tubular portion 46 frictionally contacting the outer wall of the dip tube 40. The second circular plate 50 may be pivoted with respect to the first circular plate 48 about the hinge portion 52 to locate the second circular plate coaxially adjacent to the first circular plate. When so positioned the ribs on the one of the circular plates cooperate to define fluid passages between the circular plates. The dispenser dip tube and filter may then be threadably engaged to the container 30 and the filter emersed in a fluid 56 within the container. The dispenser 32 may be actuated to draw fluid through the filter and into the dispenser via the tubular portion 46 and the dip tube 40. Fluid drawn into the dip tube 40 must first pass between the ribs 54 of the filter. It will be understood that solid material suspended in the fluid 56 will be prevented from entering the dip tube by the ribs 54.

The ribs 54 may extend radially inwardly from the circumference of the circular plates 48 and 50 and, thus the area for filtering may be maximized. The second circular plate 50 may be located adjacent and parallel to the bottom wall 36 of the container 34. In this configuration, virtually all of the fluid 56 may be withdrawn from the container 34 through the filter, before the fluid level falls below the level of the passages between the ribs.

Figure 3:
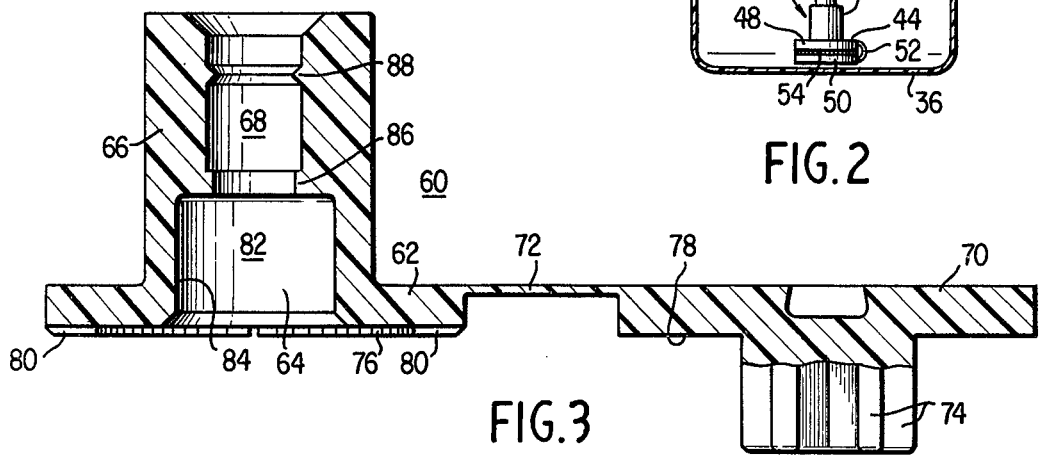
FIG. 3 is a cross-sectional view of a one-piece molded member for providing a fluid filter according to an embodiment of the present invention.

FIG. 3 is a cross sectional view of a one piece molded member 60 for providing a fluid filter according to an embodiment of the present invention. The member may include an annular plate portion 62 having a central opening 64. A tubular portion 66 may extend axially from the annular plate portion, a hollow 68 of the tubular portion communicating with the central opening 64 in the annular plate portion. A generally circular plate portion 70 may hingedly connected to the annular plate portion 62 by a hinge portion 72 of relatively thinner cross section than either of the plate portions. Members 74, axially extending from the circular plate portion may be adapted to pressurely engage the tubular portion 66 to maintain surfaces 76 and 78 of the plate portions coaxially adjacent one another. At least one of the surfaces 76 and 78 may be formed with radially extending ribs, such as ribs 80. When the surfaces 76 and 78 are located coaxially adjacent to one another, the ribs provide a plurality of fluid passages between the plates which communicate with the hollow 68 of the tubular portion 66.

The tubular portion 66 may be formed with a first hollow portion 82 for receiving the members 74. Radial ends of the members 74 may pressurely engage the inner wall 84 of the tubular member. The tubular portion 66 may be formed with first and second inwardly extending flanges 86 and 88. When the dip tube is inserted into the hollow 68 of the tubular portion 66 the flange 86 limits the extent to which the dip tube may be inserted. The gripping flange 88 is adapted to frictionally engage the dip tube and inhibit separation of the filter from the dip tube.

Figure 4:
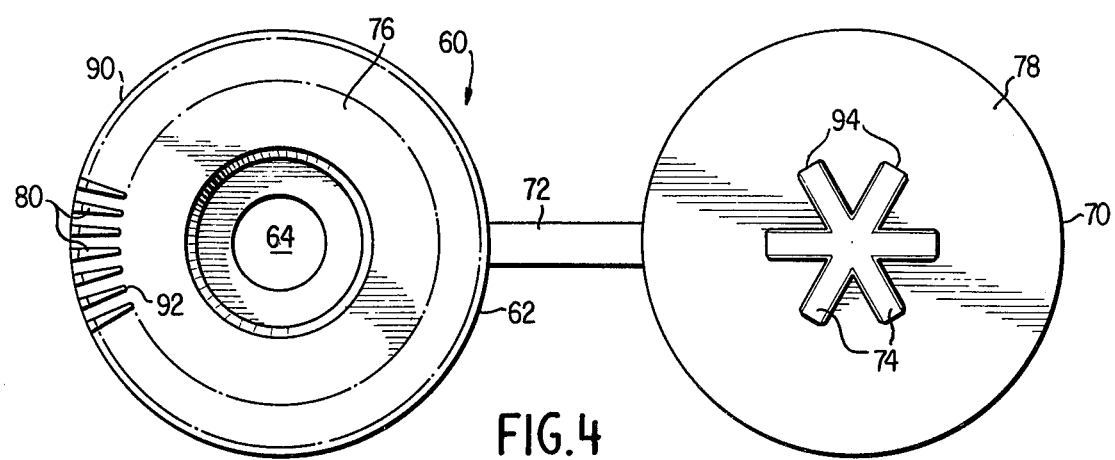
FIG. 4 is a plan view of the molded member of FIG. 3.

FIG. 4 is a plan view of the molded member 60 described in connection with FIG. 3, like structures being identified by the same numerals employed in FIG. 3. The molded member 60 includes the annular shaped plate 62 connected by the hinge portion 72 to the circular plate portion 70. In the embodiment of FIGS. 3 and 4 the surface 78 of the plate 70 is relatively smooth and the surface 76 of the plate 62 is formed with the ribs 80. The ribs 80 may extend radially inwardly from a circumference 90 of the surface 76 to a radius 92 intermediate the circumference and the central opening 64 in the annular plate 62. In this way maximum filtering area is obtained along the circumference 90 of the plates, while restriction of fluid flow is minimized.

The members 74 for pressurely engaging the tubular portion may extend radially outwardly as shown in FIG. 4. Radial ends 94 of the members 74 are adapted to engage the inner wall of the tubular portion 66 (shown in FIG. 3).

In operation the circular plates may be pivoted with respect to one another to coaxially align the plates and locate the surfaces 76 and 78 adjacent one another, the members 74 engaging the tubular portion 66 to maintain the surfaces adjacent one another. Solid material prevented from entering the dip tube by the ribs 80 may accumulate in the vicinity of the ribs. When this occurs the plates may be pivoted with respect to one another about the hinge portion 72 to expose the ribs to permit the solid material to be cleaned away.

The principals, preferred embodiments and modes of operation of the present invention have been described in the foregoing specification. The invention which is intended to be protected is not, however, to be construed as limited to the particular forms disclosed, since these are to be regarded as illustrative rather than restrictive. Variations and changes may be made by those skilled in the art without departing from the spirit and scope of the present invention.

What is claimed is:

1. An article of manufacture for providing a fluid filter for an inlet conduit of a spray dispenser comprising a molded member having:
    an annular plate portion;
    a tubular portion in communication with a central opening in said annular plate portion, for engaging an end of the inlet conduit;
    a generally circular plate portion, at least one of the surfaces of said plate portions having radially extending ribs for providing a plurality of fluid passages between said plates when the surfaces are located adjacent one another;
    a flexible hinge portion connecting an area on the circumference of said circular plate portion to an area on the outer circumference of said annular plate portion; and,
    means for maintaining a surface of said circular plate portion adjacent a surface of said annular plate portion, including a male member attached to said generally circular plate portion, comprising a plurality of radially extending, resilient members with channels therebetween, wherein said male member is adapted for insertion into said tubular portion to pressurely engage an inner wall of said tubular portion and wherein the channels in said male member are adapted to communicate between the inlet conduit and the plurality of fluid passages between said plate portions.

2. The article of manufacture of claim 1 wherein said tubular portion includes a radially inwardly extending flange portion for gripping the end portion of the inlet conduit.

3. The article of manufacture of claim 1 wherein at least some of said ribs extend radially inwardly from the circumference of the surface on which the ribs are formed to a point intermediate the circumference and the inner circumference of said annular plate portion.

4. A filtered fluid supply apparatus for a liquid dispenser comprising:
    a fluid container adapted for attachment to the fluid dispenser;
    an inlet tube for the dispenser extending from the fluid dispenser into said container; and
    means attached to said inlet tube for filtering fluid entering the free end of the inlet tube, said filtering means including:

a first generally circular plate, hingedly connected to a second generally circular plate; and a male member axially located on one of said plates adapted for selective insertion in an aperture in the other of said plates to position said plates adjacent one another, said male member having axially extending channels therein;

wherein at least one of said plates has radially extending ribs providing a plurality of fluid passages between the plates in communication with the free end of said inlet tube via the channels in the male member; and, wherein one of said plates is located parallel and adjacent a bottom wall of the fluid container, said apparatus being adapted to filter fluid drawn radially inwardly toward the inlet tube through said fluid passages between the plates.

5. A one piece unitary filter for the free end of the dip tube of a fluid dispenser having a fluid reservoir comprising:

first and second members, said first member having an aperture therein communicating with the hollow of a tubular portion attached to said member, said tubular portion being adapted for attachment to the free end of the dip tube of the fluid dispenser so that fluid communication is established between the interior of the dip tube and the hollow of said tubular portion;

at least one of said members having a plurality of grooves in a surface thereof extending toward the aperture in said first member for providing fluid passages between said members from the fluid reservoir to the aperture when the grooved surface is positioned in immediate proximity to a surface of the other member;

said first and second members being hingedly connected, and said second member including means for maintaining the surfaces of said members in immediate proximity with one another including a male member extending from said second member, adapted for insertion into said tubular portion and providing a fluid passage communicating between the dip tube and the plurality of grooves.

* * * * *